Aug. 6, 1968  J. GREENHUT  3,396,251
CENTRIFUGAL SPEED-RESPONSIVE DEVICE WITH CONTRA-DIRECTIONAL
SPRING-LOADING ARMS ACTING UPON A NON-COMPRESSIBLE SPRING
Filed Oct. 7, 1966  4 Sheets-Sheet 1

INVENTOR.
JOSEPH GREENHUT
BY
ATTORNEYS.

Aug. 6, 1968 J. GREENHUT 3,396,251
CENTRIFUGAL SPEED-RESPONSIVE DEVICE WITH CONTRA-DIRECTIONAL
SPRING-LOADING ARMS ACTING UPON A NON-COMPRESSIBLE SPRING
Filed Oct. 7, 1966 4 Sheets-Sheet 2

INVENTOR.
JOSEPH GREENHUT
BY
ATTORNEYS.

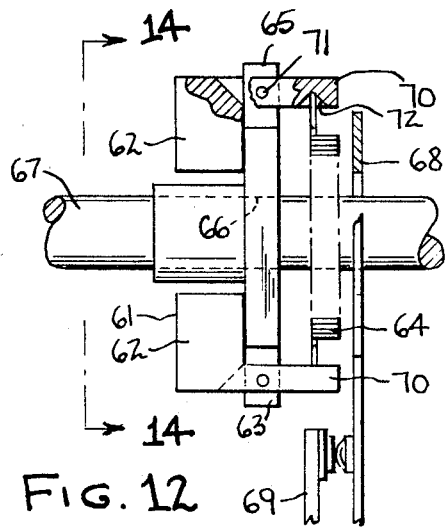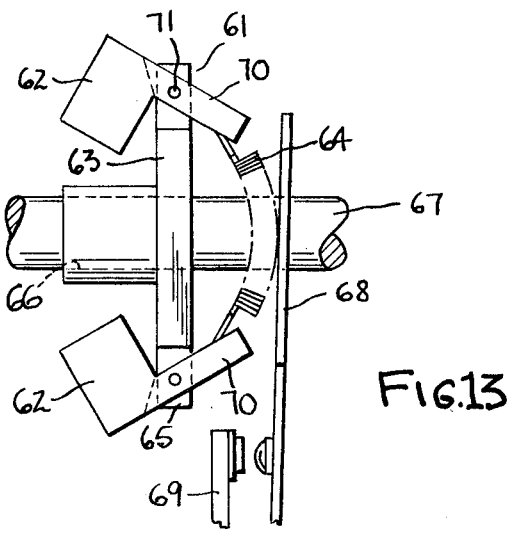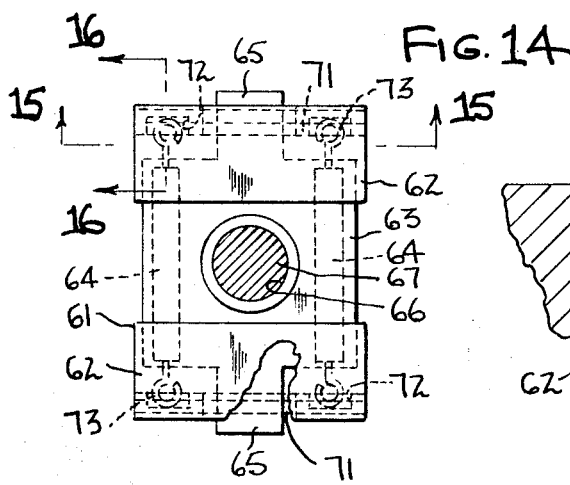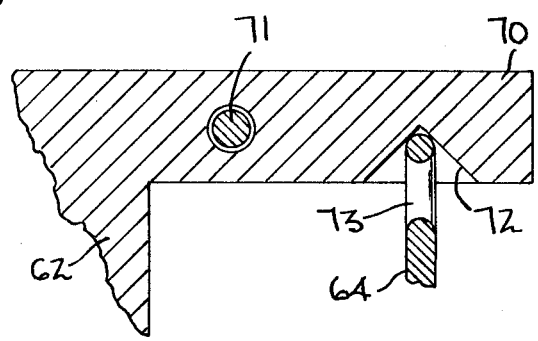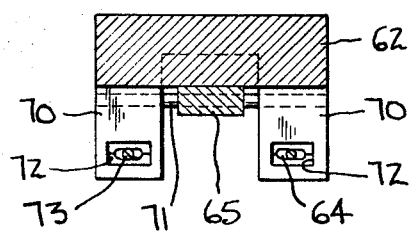

INVENTOR.
JOSEPH GREENHUT
ATTORNEYS.

United States Patent Office 3,396,251
Patented Aug. 6, 1968

3,396,251
CENTRIFUGAL SPEED-RESPONSIVE DEVICE
WITH CONTRA-DIRECTIONAL SPRING-
LOADING ARMS ACTING UPON A NON-
COMPRESSIBLE SPRING
Joseph Greenhut, 3333 Warrensville Center Road,
Shaker Heights, Ohio 44120
Filed Oct. 7, 1966, Ser. No. 585,180
14 Claims. (Cl. 200—80)

ABSTRACT OF THE DISCLOSURE

A rotary centrifugal speed-responsive device for actuating a control element at a predetermined speed of rotation in which contra-pivotal spring-loading lever arms are fixed to pivotally mounted weights, and a non-compressible spring element is pivotally mounted between the lever so as to deform into a control-actuating bowed displacement when the ends thereof are subjected to a predetermined value of load resulting from inward weight-induced movement of the spring-loading arms. The inherent load-deflection pattern of the non-compressible spring can be modified for more sensitive snap-action by using a second lever arm fixed to each weight which will abut the span of the spring when the rotary device is in a state of rest or low speed and prevent or restrain its deflection; however, its length and position in relation to the loading arm is such that its rate of travel will disengage it from restraint on the spring at a higher predetermined speed and permit effective snap-action displacement upon the sudden relief of the artificial overload which the restraining lever arm has created.

---

The present invention relates generally to speed-responsive centrifugal devices for control purposes, and more particularly, to such devices utilized in association with electric motors.

Certain types of electric motors have a running or main winding and a supplementary starting winding which is retained in the circuit only until the motor has attained a pre-selected speed approaching its normal operational or running speed. This type of arrangement is well known in the art and is considered necessary or desirable to improve the starting characteristics of split-phase motors and the like in which the speed-torque characteristics of the main winding alone would result in poor starting performance.

A starting switch, which is closed when the motor is at rest, maintains the starting winding in the energizing circuit of the motor at the time the motor is initially energized. This starting switch is ordinarily mounted on or associated with the casing or frame of the electrical motor and is often referred to as the "stationary" switch.

A speed-responsive device, commonly referred to as the "rotary," is mounted on the shaft or rotor portion of the motor for rotation therewith. When the motor is at rest, the speed responsive device is in a position to maintain the stationary switch in a closed position. When the motor is energized, the starting winding is thereby maintained in the circuit. However, the centrifugal forces operating upon the rotary device becomes progressively greater as the rotational speed of the motor increases and cause the rotary device to disengage or retract from the switch-closing position, thereby causing or permitting the stationary switch to open and break the starting winding circuit when a predetermined motor speed has been attained.

For a discussion of the problems encountered in effecting proper cooperating between the stationary switch and the rotary device, as well as for examples of some prior art stationary switches and rotary devices, reference is made to my prior U.S. Patent Nos. 2,616,682 of Nov. 4, 1952 and 2,768,260 of Oct. 23, 1956.

I have found that the advantages and improved performance of the snap-action centrifugal device described in my Patent No. 2,616,682 can be achieved in a different and novel arrangement of centrifugal device, which has greater versatility and can be manufactured at less cost than the device of Patent No. 2,616,682.

The device disclosed in the patent utilizes a specially heat-treated spring steel of unusual configuration and having certain critical physical and dimensional characteristics. The rotary device which is the subject of the present invention utilizes a flat, phosphor-bronze leaf spring which can be standardized for a variety of applications, with variations in performance being effected by certain changes, to be described, in the centrifugal weights, without necessarily requiring any change in the physical or dimensional characteristics of the spring itself.

It is a primary object of my invention to provide a speed responsive centrifugal device having a positive, snap-action movement.

Other objects and advantages of my invention will become apparent during the course of the following description.

In the drawings, in which like reference numerals designate like parts throughout the same, FIG. 1 is a view in side elevation of a centrifugal device embodying the features of my invention mounted in operative association with a stationary starting winding switch of an electrical motor.

FIG. 12 is a view in side elevation, similar to FIG. 1, but showing still another form of the invention.

FIG. 13 is a view similar to FIG. 12, but showing the device in retracted position.

FIG. 14 is a cross-sectional view, taken as indicated on line 14—14 of FIG. 12.

FIG. 15 is a cross-sectional view, taken as indicated on line 15—15 of FIG. 14.

FIG. 16 is a cross-sectional view, taken as indicated on line 16—16 of FIG. 14.

Referring more particularly to FIGS. 1–6 of the drawings, I have shown a stationary starting winding switch 21 mounted on the frame or casing 22 of an electrical motor having a shaft 23. A speed-responsive centrifugal device or rotary unit 24 is secured to the motor shaft 23 in operative association with the stationary switch 21.

Figure 1:
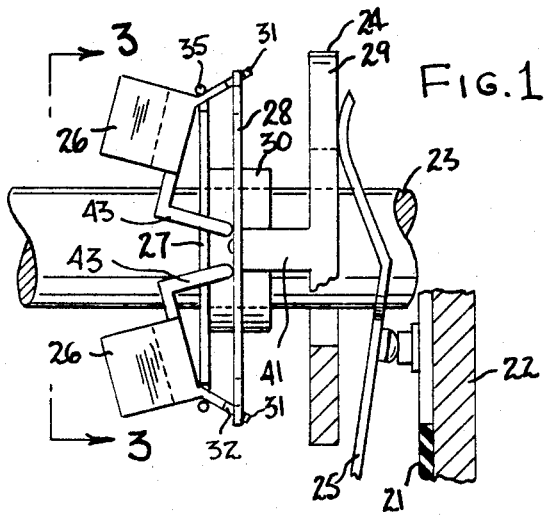
Figure 2:
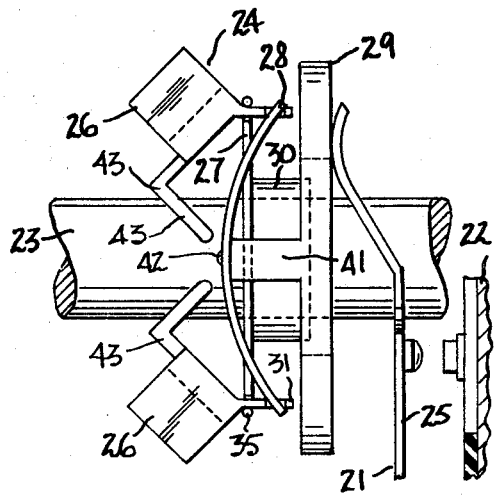
FIG. 2 is a view similar to FIG. 1, but showing the centrifugal device in its retracted or withdrawn position, after the snap-action has occured.
Figure 3:
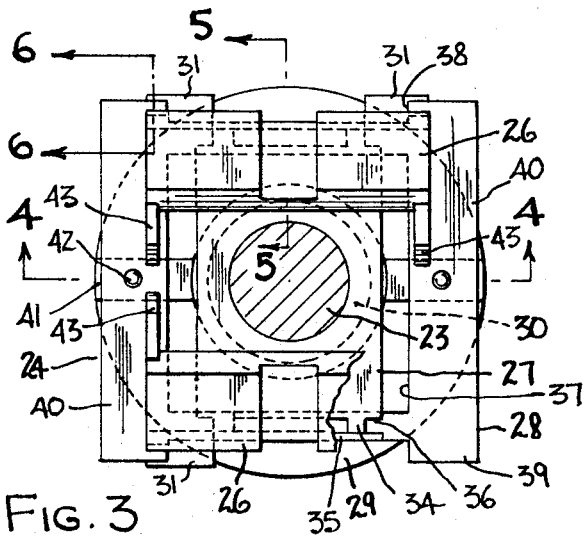
FIG. 3 is a view of the centrifugal device, taken as indicated on line 3—3 of FIG. 1.
Figure 5:
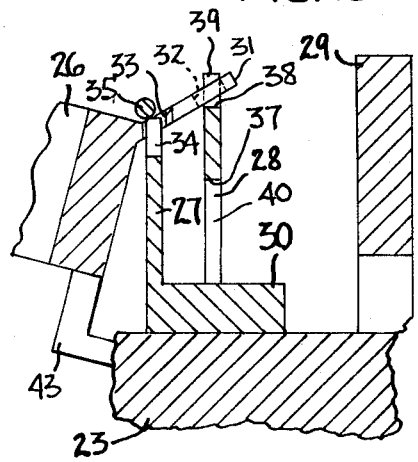
FIG. 5 is a cross-sectional view, taken as indicated on line 5—5 of FIG. 3.
Figure 4:
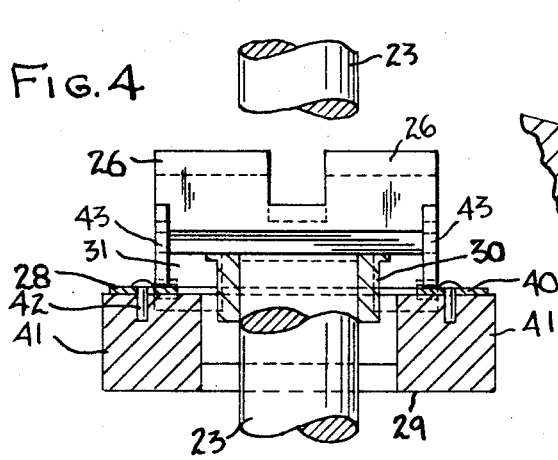
FIG. 4 is a cross-sectional view of the device, taken as indicated on line 4—4 of FIG. 3.
Figure 6:
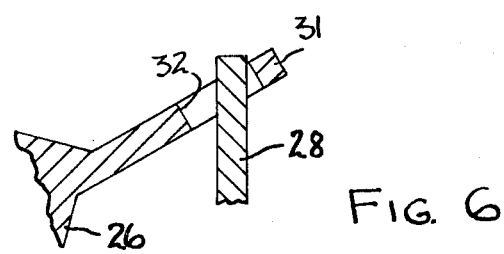
FIG. 6 is an enlarged fragmentary cross-sectional view, taken as indicated on line 6—6 of FIG. 3, and showing details of the pivotal connection between the centrifugal weights and the spring of the device.

The switch 21 is provided with a resilient normally-open switch arm 25 which, in the position shown in FIG. 1 of the drawings, has been displaced by the rotary unit 24 to a circuit-closing position to bring the starting winding of the motor into the circuit. In FIG. 2 of the drawings, the parts are shown in the position attained after the motor has reached operational speed and the rotary device 24 has been withdrawn from circuit-closing engagement with the switch arm 25, thus permitting the switch arm to open the circuit to the starting winding.

The rotary device 24 consists of four basic parts; the masses or weights 26, the base or support plate 27 to which the weights are attached, the flat or leaf spring 28 which is operatively engaged by the weights, and an axially movable switch arm engaging abutment or shoe 29 which is associated with the spring 28. The base 27 is provided with an axially extending annular collar 30 through which the motor shaft 23 extends and by means of which the rotary device 24 is fixedly secured to the shaft for rotation therewith.

Pivotally secured to opposite ends of the base 27 are the centrifugal masses or weights 26, which may be of metal or any other suitable material. Each weight is provided, along one edge thereof, with a pair of spaced depending ears 31 each of which is provided with a recess or notch 32. Extending between the spaced ears 31 is a slot or opening 33 by means of which a portion of the base 27 traverses the weight. The base plate is provided at one end thereof with spaced projecting fingers 34 which extend through the slot 33. The free ends of the fingers are traversed by a cross bar 35 which extends across a portion of each of the spaced ears 31 to prevent separation of the weights from the base plate. The projecting fingers 34 form peripheral recesses or notches 36 on the end of the base plate which provide clearance for the depending ears 31. The opposite end of the base plate 27 is correspondingly arranged so as to pivotally secure the weights 26 in diametrical opposition to each other. The ears 31 depend to a pre-determined distance below the plane of pivotal connection of the weights 26 so as to provide actuating arms for engaging the spring 28, in a manner to be described.

The leaf spring 28 is of rectangular configuration and has a central clearance opening 37 to permit the motor shaft 23 to extend therethrough. Two opposed edges of the spring 28 are recessed as at 38, leaving spaced tongues or projections 39 which extend into the notches 32 of the ears 31 as the ears themselves are received in the recess 38. The portions 40 of the spring 28 extend across and between the respective ears 31 of the opposed weights 26. That portion of the ear 31 which extends from the edge of the spring 28 to the pivotal axis of the weight 26 defines a lever arm which will act upon the edge of the spring in response to rotation of the weight about its pivotal axis.

The shoe 29 is provided with a pair of diametrically opposed axially extending bosses 41 to which the portions 40 of the spring are secured at their midpoints, by any suitable means such as fasteners 42.

The inboard portion of the weights 26 is provided with an angularly extending lever arm or restraining arm 43 which abuts and rests upon the portion 40 of spring 28 and maintains the weights slightly elevated above the plane of the base plate 27. The linear distance between the pivotal axis of the weights and the point of abutment of the restraining arm 43 on the spring defines an effective length of lever arm which has a pre-determined ratio to the length of lever arm provided by the ears 31. This ratio of lever arm lengths, as well as the location of the point of abutment of the restraining arm 43 on the spring, are variable factors in the design of the rotary device, the principles of which will become evident as the description proceeds.

The spring 28 can be of steel, phosphor-bronze, or other suitable material and has herein been described and shown as a unitary element. It will be understood that the portions 40 of the spring 28 need not necessarily be parts of a single element, but could be independent portions, if desired, provided that such portions have substantially equal dimensional and physical characteristics.

In FIG. 1 of the drawings, the rotary device 24 is shown as it appears in a non-rotating position of rest. The weights 26 are disposed rearwardly of the support base 27 to which they are pivotally secured, and the arms 43 and ears 31 extend forwardly of the weights into engagement with the spring 28. The shoe 29 is forwardly of the spring 28 and engages the switch arm 25 to close the starting winding circuit of the motor. The switch arm 25 yieldably opposes the shoe 29, but this resilient opposing force is of such relatively low value that it is easily overcome by the spring 28, which is in a slightly stressed condition. The force values which exist when the rotary device is in a position of rest are of such relatively low magnitude that there is very little deformation of the spring 28 and, for clarity of explanation, it may be considered as being flat and non-deformed. In actuality, some slight bowing or deformation of the spring 28 will exist at all times due to the force exerted by the resilient switch arm 25 on the shoe 29 in opposition to the action of the spring 28.

When the electric motor is energized, the motor shaft commences to rotate at progressively increasing speeds, causing centrifugal forces to act upon the pivotally mounted masses 26 to move them pivotally outwardly to a progressively greater extent. As the weights move outwardly, the opposed sets of ears 31 move inwardly toward each other, which movement is opposed by the spring portions 40. As the centrifugal forces transmitted to the ears 31 overcome the opposition of the spring 28, the spring yields and is deformed into a bowed arcuate shape. This temporary deformation of the spring results in a deflection or increasing amplitude of the portions 40, which is maximum at the midpoint of those portions. As the portions 40 are deflected, they move rearwardly relatively to the support base 27 and the attached shoe 29 moves rearwardly therewith.

Figure 8:
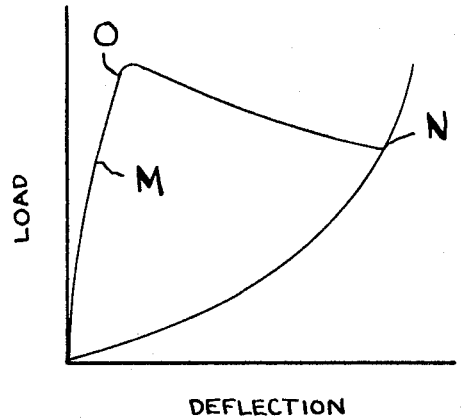
FIG. 8 is another graph showing the load-deflection curve of the spring of the centrifugal device and the modification of that curve in the operation of a centrifugal device embodying the features of my invention.

In the absence of the restraining arms 43, the deflection of the spring 28 and the accompanying retractive movement of the shoe 29 would occur at a substantially uniform rate as the motor speed increased, so as to cause a gradual withdrawal movement of the shoe with respect to the switch arm 25. This type of gradual retractive movement of the shoe 29 is undesirable and results in excessive sparking at the switch contacts, fluttering of the switch and a lack of precision and predictability in the cut-out speed at which the circuit to the starting winding will be broken. In FIG. 8 of the drawings, the reference character N designates the load-deflection curve of the spring 28 in the rotary device 24, as it would exist if the restraining arms 43 were not utilized in the device.

The use of the restraining arms drastically modifies the normal load-deflection curve N of the spring and creates a snap action which is illustrated in the curve M of FIG. 8. The snap action of the spring 28 serves to minimize and obviate the disadvantages mentioned above which result from gradual deflection of the spring 28 pursuant to the normal load-deflection curve N of the spring.

Figure 7:
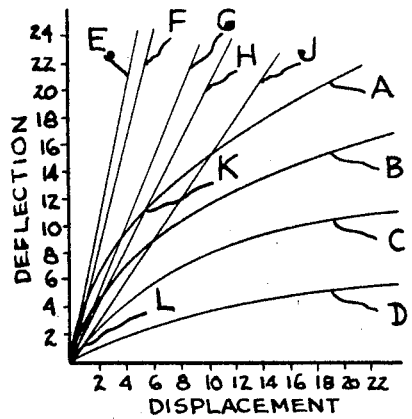
FIG. 7 is a graph which illustrates the principle of operation of my centrifugal device.

Referring to FIG. 7 of the drawings, the principle of operation of the restraining arm 43 will now be explained. The abscissa of the graph of FIG. 7 represents units of linear displacement of the portion 40 of the spring which are caused by the inward movement of the ears 31 in response to the centrifugally induced pivotal outward movement of the weight 26. The ordinate of the graph of FIG. 7 represents the units of deflection of the spring portion 40, as measured by the amplitude of the arc which is created as a consequence of the linear shortening of the effective length of the spring plotted on the ordinate of the graph. The curve A indicates the amplitude or deflection of the spring portion 40 at its midpoint or highest point of deflection. The curves B, C and D indicate the amplitude or deflection of the spring at points other than the midpoint; the curve B representing a point on the spring which has an amplitude of 75% of the amplitude at the midpoint, the curve C representing a point having 50% of the amplitude of the midpoint, and the curve D representing a point having 25% of the amplitude of the midpoint of the spring. It will be noted that the slope of the curves A, B, C and D decrease gradually as the linear displacement increases, reflecting the fact that the amplitude deflection of the spring increases at a greater rate initially than it does with subsequent unit increments of linear displacement.

Inasmuch as the restraining arm 43 represents a lever arm having a fixed ratio of length to the lever arm represented by the ears 31, the linear movement of the end of the lever arm 43 rearwardly, away from the spring, is directly proportional to the inward movement of the ears 31. Using a ratio between the lever arm 43 and the lever arm represented by the ear 31 of 10:1 in curve E, of 8:1 in curve F, of 5:1 in curve G, of 4:1 in curve H and of 3:1 in curve J, the curves E, F, G, H and J indicate the linear movement of the end of the lever arm 43 at the respective ratios for each unit of inward linear movement of the lever arm represented by the ear 31.

By way of example, the curves A and H can be considered in relation to each other. It will be noted that as the ear 31 pivots inwardly to effect one unit of linear displacement of the spring, as shown by the abscissa on FIG. 7, the midpoint of the spring will be deflected to an amplitude of eight units while the end of the lever arm 43 will have had a simultaneous linear movement of four units in a direction away from the spring. If the end of the lever arm 43 is considered as being positioned at the midpoint of the spring, the amplitude of which is represented by the curve A, it is apparent that the arm 43 interferes with the deflection of the spring, as the linear movement of the end of the arm 43 is less than the normal amplitude deflection of the spring at its midpoint. Thereby, the arm 43 restrains the amplitude deflection of the spring and prevents it from achieving its normal deflection. This results in a buckling or deformation of the intermediate portions of the spring portions 40 to compensate for the restraint or loading effect of the arm 43 on the spring. At the point K where the curve H intersects the curve A, the amplitude deflection of the spring at its midpoint is equal to the rearward linear movement of the end of the arm 43 and there is no longer any restraint by the arm on the deflection of the spring. All points on the curve H which lie below the intersection point K represent a condition of restraint by the arm 43 on the deflection of the spring; all points on the curve H which lie above the point K represent a condition in which the linear movement of the end of the lever arm 43 exceeds the normal deflection amplitude of the spring at its midpoint, as represented by the curve A, and therefore there is no restraining influence or loading of the spring by the arm 43.

A similar analysis can be made of the relationship between the curve H and the curve C. This relationship represents a condition in which the ratio between the lever arms is maintained at 4:1, but the end of the lever arm 43 abuts the spring portion 40 at a point midway between the edge of the spring and its midpoint. The point L at which the curve H intersects the curve C represents the point at which there is equal linear movement by the end of the arm 43 and by the deflection of that portion of the spring which is in contact with the end of the arm 43. That portion of the curve H which lies below the point L represents a condition of restraint by the arm 43; that portion of the curve H which lies above the point L represents a condition of no restraint by the arm 43. It will be noted that although the points K and L are functionally comparable, it requires a lesser magnitude of linear displacement of the spring 28 to achieve the condition represented by point L, than it does to achieve the like condition represented by the point K.

It will be apparent that comparable relationships exist between each of the curves E, F, G and J and each of the curves A, B, C and D. In each instance, a condition can be found in which the arm 43 restrains the spring against normal deflection until a certain extent of linear displacement of the spring has occurred, after which the restraint is eliminated. The relative length of the lever arm 43 and the location of the end of the lever arm 43 on the spring portion 40 are the factors which determine the magnitude and duration of the restraint effected by the arm 43 on the spring. Thus, in designing such a rotary device to achieve desired performance characteristics, these factors can be varied to obtain varying results without any change in the physical or dimensional characteristics of the spring 28.

The effect of the restraint by the arm 43 is shown graphically in curve M of FIG. 8, which is superimposed upon the normal load deflection curve N of the spring 28, as previously mentioned. Due to the interference exerted by the restraining arm 43, the rate of operative deflection of the spring in relation to load or linear displacement is substantially reduced, so that abnormal loading or overloading of the spring is artificially induced until the point O is reached on the curve M, at which point snap-action occurs as a result of the sudden translation of the overload into the normal deflection pattern of the spring, as represented by the curve N.

Although the design characteristics and design factors relating to the length ratio of the arm 43 and its location with reference to the midpoint or maximum deformation amplitude of the spring 28 have been discussed in terms of a location of the arm 43 on that portion of the spring which lies to the same side of the midpoint of the spring as does the weight 26 to which the arm 43 is attached, it will be apparent that the location of the end of the arm 43 can be on the other side of the midpoint of the spring, if desired. In certain circumstances, where an unusually high lever arm ratio is desired between the arm 43 and the arms 31, such an arrangement, in which the lever arm 43 traverses the midpoint of the spring, may be utilized. The principle of operation of the rotary device, as indicated in FIGS. 7 and 8 will remain the same as previously described, the essential advantage being that the maximum length of the arm 43 is not limited by the midpoint of the spring, thus permitting the utilization of higher lever arm ratios in the design of the device. Such an arrangement is indicated in the modified form of invention shown in FIGS. 9–11 of the drawings.

Figure 9:
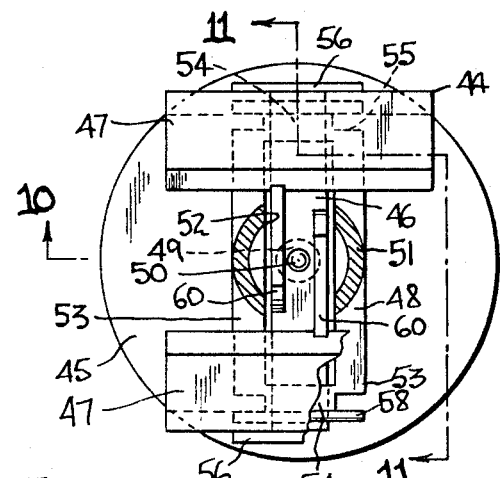
FIG. 9 is a view similar to FIG. 3, but showing a modified form of the invention.

The form of rotary device, described above, has its parts so arranged as not to interfere with the motor shaft 23, which can extend therethrough. If the rotary device is to be used on the end of a shaft, rather than in an application where the shaft is required to run through the device, then it is unnecessary to arrange the parts in a manner to provide clearance for the traversal of the shaft. FIG. 9 of the drawings shows a rotary device embodying the principles previously described, but which is modified by mounting the spring and its cooperating parts in a median or central position, which is feasible when the device is mounted on the end of the rotating shaft or is used with a split shaft.

Figure 11:
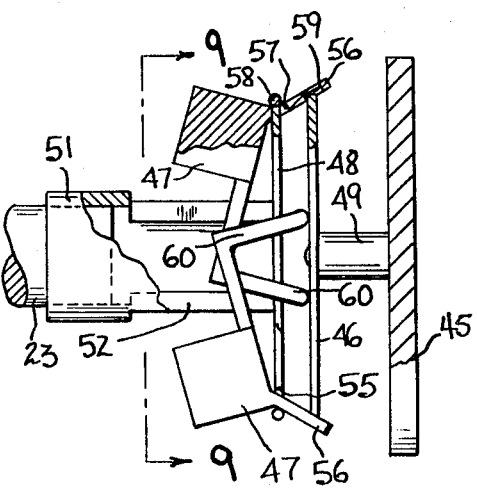
FIG. 11 is a cross-sectional view, taken as indicated on line 11—11 of FIG. 9.
Figure 10:
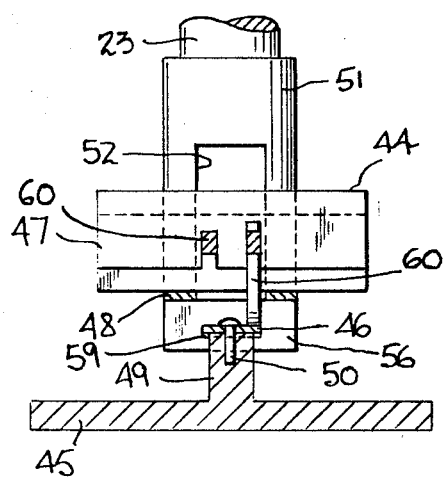
FIG. 10 is a cross-sectional view taken as indicated on line 10—10 of FIG. 9.

Referring more particularly to FIGS. 9–11 of the drawings, I have shown a rotary device 44 which includes the same four basic elements previously described, namely, a shoe 45, a leaf spring 46, weights 47 and a support base 48 for the weights. The shoe 45 is provided with a central boss or projection 49 to which the flat rectangular leaf spring 46 is affixed at its midpoint, as by securing means or fasteners 50.

The support element 48 is provided with a centrally located collar 51, a portion of which is slotted or split as at 52 to provide clearance for the action of the spring 46. The support base 48 includes the branches 53 which extend outwardly from the collar 51 from diametrically opposite sides thereof and terminate in the fingers 54 which form a notch 55 at the end of the branch.

The weight 47 is provided with a depending ear 56 which is slotted as at 57 so as to permit traversal thereof by the fingers 54. A cross bar 58 is affixed to the free end of the finger 54 and thereby the weight 47 is pivotally secured to the support base 48. Near the outer end thereof, the ear 56 is provided with a cavity or depression 59 in which one end of the spring 46 is accommodated and received. The inboard portion of the weight 47 has a restraining arm 60 extending therefrom into abutment with a portion of the spring 47. The oppositely disposed arms 60 traverse the midpoint of the spring 47 in a cross-over relationship. As previously mentioned, whether the arms 60 cross over each other or not is determined by the magnitude of the leverage ratio desired.

The principle of operation of the rotary device 44 is the same as that previously described for the rotary device 24. In response to axial rotation, centrifugal forces operate upon the weights 47 to cause them to pivot outwardly and effect linear displacement of the ends of the flat spring 46 through the lever arm exerted by the ears 56. This linear displacement is translated into a bowing or deformation of the spring, whose amplitude is at a maximum at the midpoint of the spring where it is attached to the shoe 45. As the spring deforms, the shoe is retracted so as to withdraw from its circuit-closing engagement with the starting winding switch. The lever arm created by the restraining arm 60 restrains and interferes with the normal deflection of the spring 46, in the manner indicated in the graphs illustrated in FIGS. 7 and 8 of the drawings. As in the previously described form of the invention, this arrangement results in a snap action retraction of the shoe 45. Also, as in the previously described form of invention, the edge of the notch 55 of the support base 48 provides an abutment which will limit outward pivotal movement of the weight when the ear 56 has been rotated inwardly sufficiently to engage the abutment.

Inasmuch as the shaft on which the rotary device 44 is mounted does not extend through the device, as it does in the device 24, the switch arm or other element which is to be controlled by the action of the speed responsive device 44, can be disposed in axial alignment with the midpoint of the spring 46. As a consequence, it is apparent that the use of the shoe 45 may not always be necessary or desirable, as direct engagement between the midpoint of the spring 46 and the controlled element is possible. Thus, under certain circumstances, the intermediate function performed by the shoe 45 can be eliminated and the spring 46 can engage and act directly upon the controlled element and may even serve as an electric circuit element.

Referring now to FIGS. 12–16 of the drawings, I have shown another form of the invention in which the snap action rotary device 61 is so arranged that the spring can act directly upon the controlled element, even in through shaft mountings, and there is no need for a shoe, such as the shoes 29 or 45, previously described.

In this form of the invention, the essential parts of the speed responsive rotary device are the weights 62, the support base 63 for the weights and the coil springs 64. The support base 63 is provided with projecting tongues 65 at opposite ends thereof and is also provided with a central opening 66 which provides a collar by means of which the base can be fixedly secured to a rotatable shaft 67 which extends therethrough. The shaft 67 also extends through a resilient switch arm 68 of a normally-closed starting winding switch 69. The switch arm 68 is preferably disk-shaped so as to present a continuous surface engageable by the springs 64, in the manner hereafter described.

Each of the masses or weights 62 is provided with spaced depending ears 70 between which one of the tongues 65 of the base is received. The weights 62 are pivotally secured to the base 63 by means of a pivot pin 71 which extends through the tongue 65, transversely thereof, and into the ears 70. The depending ears 70 function as lever arms in the same manner as the ears 31 or 56, previously described with reference to the other forms of the invention.

Each of the ears 70 is provided adjacent its lower end with a recess or cavity 72 for the purpose of retaining one end of the coil spring 64.

Each of the springs 64 is of the type commonly referred to as "constant tension" and has the characteristic feature of maintaining a substantially uniform load or force over a broad range of deflection. The ends 73 of each spring are substantialliy aligned on one side of the helix of the spring and, in response to loading of these ends, the spring 64 tends to deform or buckle bodily in an arcuate pattern. This deformation of the spring 64 is shown in FIG. 13 of the drawings and can be considered comparable to the pattern of deformation previously described with respect to the portion 40 of the spring 28.

In FIG. 12 of the drawings, the rotary device 61 is shown in a position of rest, with the springs 64 adjacent to or just abutting the resilient normally-closed switch arm 68. In this position of the switch arm, the starting winding circuit of the motor is closed.

When the motor is energized, the starting winding is maintained in the circuit by the switch 69. However, as the speed of the motor shaft 67 progressively increases, the centrifugal forces acting upon the weights 62 causes them to pivot outwardly with respect to the support base 63 and, concurrently, cause the ears 70 to move toward each other and load the springs 64 at their ends 73.

Figure 17:
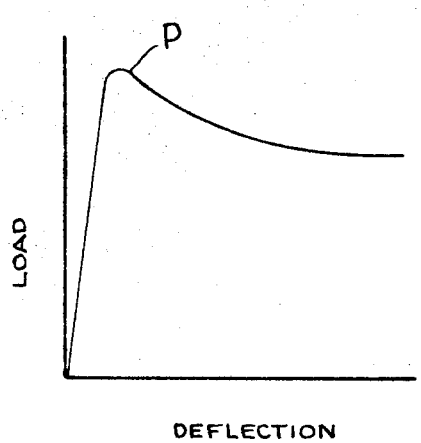
FIG. 17 is a graph of the load-deflection curve during the operation of the centrifugal device illustrated in FIGS. 12–16.

As graphically illustrated in FIG. 17 of the drawings, there is little bodily deflection of the spring during the initial loading thereof. However, as soon as this initial deflection resistance of the spring has been overcome by increased loading, a more horizontal load-deflection characteristic is developed. The rapid acceleration of load on the ends 73 of the spring by the centrifugal forces acting on the weights 62, and the consequent rapid radial displacement of the ears 70, creates a momentary overload condition on the spring 64 resulting in snap-action of the spring. This condition is indicated by the point P on the curve of FIG. 17.

In response to the snap-action deformation of each of the springs 64, the switch arm 68 is displaced from its normally-closed position, thereby opening the circuit to the starting winding. This open circuit is maintained by the bowed-out springs 64 during the normal operation of the electrical motor, as shown in FIG. 13, and until the motor is de-energized or otherwise substantially reduced in speed.

Figure 18:
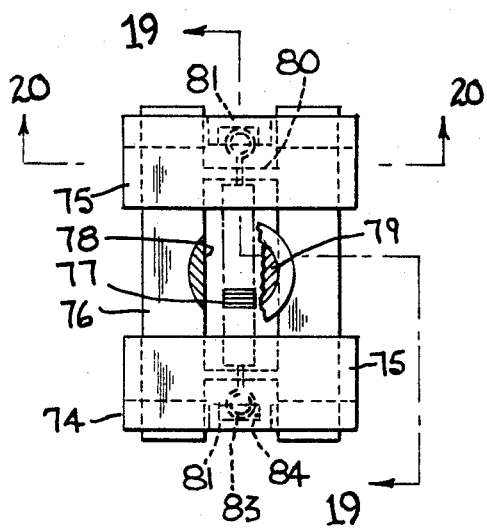
FIG. 18 is a view similar to FIG. 14, but showing a modified form of the device of FIG. 14.
Figure 19:
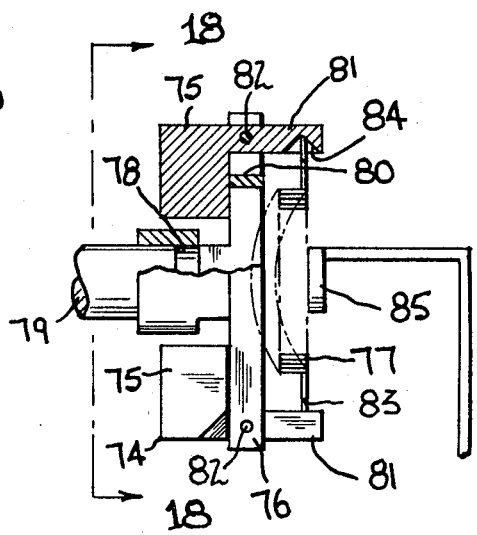
FIG. 19 is a cross-sectional view, taken as indicated on line 19—19 of FIG. 18.
Figure 20:
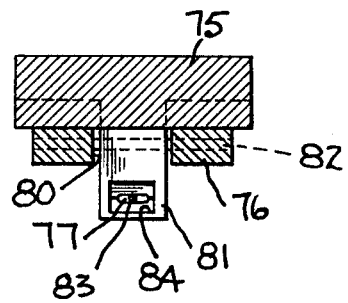
FIG. 20 is a cross-sectional view, taken as indicated on line 20—20 of FIG. 18.

In FIGS. 18, 19 and 20 of the drawings, I have shown a modified form of the invention, utilizing the principles described in the immediately foregoing paragraphs, but utilizing a single coil spring instead of the dual coil springs heretofore described. In this form of the invention, a snap-action rotary device 74 is provided consisting of weights 75 pivotally connected to opposite sides of a support base 76, and a coil spring 77 suitably mounted in opposition to movement of the weights.

The support base 76 is provided with a central opening 78 by means of which the device can be secured to the shaft 79 of the motor or other rotating unit. At opposite ends thereof, the support base or plate 76 is provided with a notch or recess 80, in which is received the depending ear 81 of each of the weights 75. A pivot pin 82 extends transversely through the ear 81 and into the plate 76 to pivotally secure the weights to the support base.

The constant tension coil spring 77 extends between the opposed ears 81. The ends 83 of the spring are retained in recesses or cavities 84 which are provided at the lower end of each of the ears 81. However, in contrast to the previously described arrangement of the coil springs 64, the spring 77 is mounted so as to bow inwardly toward the base 76, rather than away therefrom, the base having a configuration which will provide clearance for such movement. It will be understood that the aligned position of the ends 83 to one side of the helix of the spring 77 will normally cause deflection of the body of the spring in a direction to the opposite side of the helix. Therefore, the spring 77 can be positioned between the weights in a manner to cause it to bow outboard of the device or inboard thereof, as desired.

When the rotary device 74 is at rest, the spring 77 abuts and engages a resilient contact element 85 which is an element of the starting winding circuit of the motor. The element 85 may be considered as a normally-closed switch arm, as in the case of the previously described switch arm 68, or it may be considered simply as one contact of a switch, whose other contact is provided by the spring 77, which then becomes a circuit element of the starting winding circuit.

The rotary device 74 operates upon the same principle as the previously described rotary device 61. When the device is at rest, the spring 77 is in a substantially non-deformed condition, engaging the element 85, and the starting winding circuit is closed. When the motor is energized, the starting winding is maintained in the circuit until a predetermined shaft speed is attained, at which time the centrifugal forces acting upon the weights 75 cause a snap-action deformation and bowing of the spring 77 to disengage it from contact with the element 85 and thereby open the starting winding circuit.

Although I have described the form of invention of FIGS. 12–20 as being usable without need for an auxiliary shoe, such as the shoe 29, it will be apparent that a shoe or spool or wear pads or other suitable members may be associated with the coil springs so as to be disposed between the coil springs 64 or 77 and the controlled element, instead of having the coil spring act directly upon the controlled element.

It is to be understood that the forms of my invention, herewith shown and described, are to be taken as preferred examples of the same, and that various changes may be made in the shape, size and arrangement of the parts thereof, without departing from the spirit of the invention or the scope of the subjoined claims.

Having thus described my invention, I claim:

1. In a rotary centrifugal speed-responsive device for actuating a control element, the combination of a rigid support base, a plurality of oppositely disposed weights, means pivotally securing said weights to said base for outboard movement of said weights relatively thereto in response to centrifugal forces acting upon said weights, a spring-loading lever arm fixed to each weight and extending to the opposite side of said base in position to move inboard in response to said outboard movement of the weight, and non-compressible spring means pivotally mounted between opposed lever arms to yieldably resist inboard movement thereof, said weight-induced inboard movement of said lever arms progressively increasing the load on said spring means to a predetermined value sufficient to cause load-relieving pivotal movement of the ends of said spring means relatively to said opposed lever arms and concurrent bowing deflection displacement of said spring means into a control-actuating position.

2. A combination as defined in claim 1, wherein the direction of displacement of said spring means is toward said base.

3. A combination as defined in claim 1, wherein the direction of displacement of said spring means is away from said base.

4. A combination as defined in claim 1, wherein said spring means is electro-conductive and is a circuit element of an electrical circuit.

5. A combination as defined in claim 1, wherein said spring means comprises a coil spring.

6. A combination as defined in claim 1, wherein said spring means comprises a flat leaf spring.

7. A combination as defined in claim 1, including a control-engaging abutment member secured to said spring means and movable therewith.

8. A combination as defined in claim 1, wherein said spring means is flat and of rectangular configuration, opposite ends of said spring means being recessed to accommodate said spring-loading arms, said recess providing spaced projections on the ends of said spring means, and said spring-loading arms having transverse recesses provided thereon traversed by said projections to pivotally connect the ends of said spring means to said spring-loading arms.

9. A combination as defined in claim 1, including deflection-restraining means carried by said weights and disposed in the path of weight-induced deflection displacement of said spring means to overload said spring means and modify the weight-induced load-deflection characteristics thereof.

10. A combination as defined in claim 9, wherein said deflection-restraining means comprises a lever restraining arm fixed to each of said weights for movement therewith, a low-speed position of said device wherein said restraining arm engages said spring means at a location intermediate the ends thereof and in opposition to the deflection thereof caused by weight-induced movement of said spring-loading arms, and a higher-speed position of said device wherein said restraining arm disengages from said spring means in response to further inboard movement of said spring-loading arm.

11. A combination as defined in claim 10, wherein said restraining arm provides a lever having an effective length greater than the effective length of the lever provided by said spring-loading arm.

12. A combination as defined in claim 10, wherein the rate of amplitude deflection of said spring means in response to initial outboard movement of said weights is greater than the rate of corresponding movement of said restraining arm, whereby said restraining arm restricts said deflection and causes overloading of said spring means.

13. A combination as defined in claim 10, wherein said restraining arm engages said spring means at a location on the near side of the midpoint of said spring means.

14. A combination as defined in claim 10, wherein said restraining arm engages said spring means at a location beyond the midpoint of said spring means.

References Cited

UNITED STATES PATENTS

| | | | |
|---|---|---|---|
| 2,611,602 | 9/1952 | Rosenbaugh | 200—80 XR |
| 2,616,682 | 11/1952 | Greenhut | 200—80 XR |
| 2,747,854 | 5/1956 | Schnepf | 200—80 XR |
| 3,193,639 | 7/1965 | Angold | 200—80 |
| 3,194,078 | 7/1965 | Larsh | 200—80 XR |
| 3,316,371 | 4/1967 | Nelson | 200—80 |

BERNARD A. GILHEANY, *Primary Examiner.*

R. L. COHRS, *Assistant Examiner.*